March 19, 1963 W. GEFFCKEN ET AL 3,082,101
OPTICAL GLASS
Filed Nov. 10, 1958 3 Sheets-Sheet 1

INVENTORS:
WALTER GEFFCKEN and MARGA FAULSTICH

By Burger, Dinklage & Sprung
ATTORNEYS

March 19, 1963  W. GEFFCKEN ET AL  3,082,101
OPTICAL GLASS

Filed Nov. 10, 1958  3 Sheets-Sheet 3

INVENTORS:
WALTER GEFFCKEN and MARGA FAULSTICH

By Burgess, Dinklage & Sprung
ATTORNEYS

3,082,101
Patented Mar. 19, 1963

3,082,101
OPTICAL GLASS
Walter Geffcken and Marga Faulstich, Mainz, Germany, assignors to Jenaer Glaswerk Schott & Gen., Mainz, Germany, a German corporation
Filed Nov. 10, 1958, Ser. No. 773,106
Claims priority, application Germany Nov. 16, 1957
50 Claims. (Cl. 106—47)

The present invention relates to a glass for optical purposes.

Figure 1:
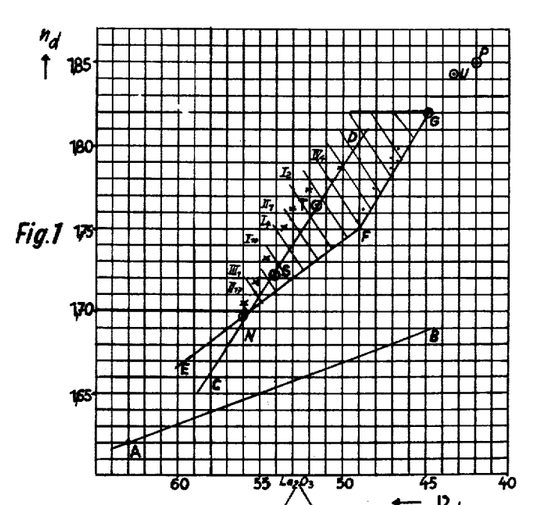

For the production of lenses of the highest light-transmitting capacity, it is of extreme importance to have glass types available which have a high refractive index and at the same time a low dispersion. The first glass types which were a real success in this regard were those described by Otto Schott, having a high content in BaO and $B_2O_3$. FIGURE 1 of the accompanying drawings indicates the well-known $n_d$-$\nu$- diagram in which the mentioned types of glass as described by Schott were all disposed underneath the line A—B thereof.

Morey was thereafter the first person who succeeded in the important step of considerably exceeding this limit by the application of considerable amounts of rare earths, particularly lanthanum and thorium. Some of these glass types as stated in the United States Patent Re. 21,175, namely, those mentioned in the examples P, T, and S of this patent, may be regarded even today as being extreme in their optical position. However, in the application of these examples in actual practice it is found that especially these extreme types incline so strongly toward crystallization that they can only be produced in units of a few cubic centimeters. This applies likewise to the example T (33% by weight of $La_2O_3$; 41% of $ThO_2$; 26% of $B_2O_3$) as well as to the example S (60% of $La_2O_3$; 40% of $B_2O_3$) of that patent. The latter stands practically isolated in the system $La_2O$—$B_2O_3$. This is due to the fact that when the content in boric acid is increased, a phase separation occurs into practically pure boric acid and into the mentioned glass S, while when the content in boric acid is lowered, the entire fused material becomes crystalline while solidifying. Because of this instability of the mentioned compositions, they have practically never been actually used. Attempts have therefore been made for a long time to produce stable types of glass by modifying the compositions. However, generally the optical position was then unfavorably changed. Only at refractive values of less than 1.70, has it so far been possible to produce extreme glass types at a practical output. One example of this type is indicated at N in FIGURE 1. It lies practically on a straight line C—D which extends through the unstable glass types mentioned in the beginning and indicated at S and T in FIGURE 1. This straight line, the ordinate value of which may be called $\nu_0$, may be analytically expressed by the equation:

(1) $\nu_0 = 55 - (n_d - 1.71)\,63.5$ and it is indicated in FIGURE 1 by the line C—D. In more recent times, the published German patent application No. 1,003,410 has also revealed stable glass compositions for glass types with a refractive index above 1.82 (see example U in FIGURE 1), the $\nu$-value of which lies unexpectedly high in view of its extreme refractive value, but still remains at less than 45. In the intermediate refractive range, that is, between 1.70 and 1.82, there have, however, so far been no stable glass types of an extreme optical position, that is, those types which lie on line C—D or even at the left thereof.

It is an object of the present invention to provide the glass types as last described.

In FIGURE 1, a few examples indicated in the accompanying tables have been marked by crosses. In comparison with some of the examples mentioned in the German Patent 949,686, which are similar in their optical position, the glass types according to the present invention differ therefrom primarily by their much greater stability which permits a production of pieces of a weight of 1 kg. and more of a perfect optical quality, whereas the comparative examples from the above-mentioned German patent may only be attained as a noncrystalline glass only in pieces of a few grams.

A further object of the present invention is to produce glass types which, although they do not possess the most extreme $\nu$ values within the region between $n_d = 1.70$ and 1.82, are perfectly stable even when molten in large batches and are therefore especially adapted for mass production. The optical position of these glass types lies about at the left of line E—F—G in FIGURE 1 which corresponds to the equations $$n_d > 1.75 + (49 - \nu)\frac{1.75}{100} \text{ for } \nu = 45 \text{ to } 49$$

$$n_d > 1.75 + (49 - \nu)\frac{0.755}{100} \text{ for } \nu > 49$$

The range to be considered for these first two objects of the invention is indicated in FIGURE 1 by the shaded area.

A further object of the invention consists in the provision of glass compositions which are suitable for mass production of glass types of a refractive index of about 1.72 to about 1.69 and are free of detrimental ingredients such as $ThO_2$ and BeO, and the optical position of which lies in the vicinity of the mentioned line C—D.

In order to attain a measurement for the more or less extreme value of the optical position of the glass types as described, the value $\Delta\nu$ was introduced which indicates the amount which the $\nu$ value of the glass type in question is increased relative to the $\nu_0$ value (see Equation 1) of line C—D in FIGURE 1 which is regarded as a standard. It may be seen from the examples stated in the following tables that $\Delta\nu$ values as high as more than 1 may be attained.

Figure 2:
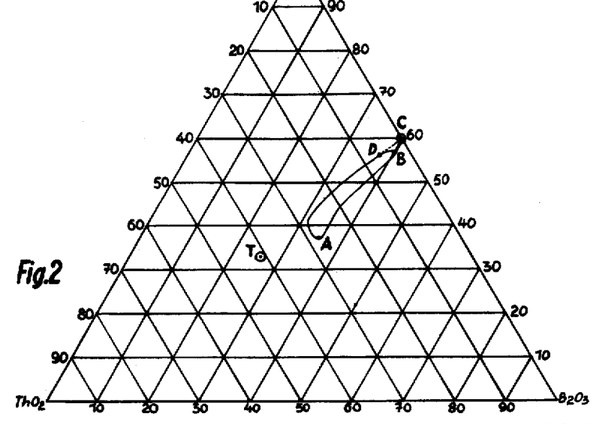

Although according to the U.S. Patent No. 2,456,033 it is supposed to be possible to produce glass types of similar extreme $\Delta\nu$ values by a content in fluorine in lanthanum glass, it is found in actual practice that, when proceeding exactly according to the manner as described in that patent, it is not possible in a single instance to attain even the smallest amounts of these glass types in a vitreous condition. It is therefore necessary, especially in view of the state of the prior art, to apply certain measures which are not disclosed in that patent in order to attain the alleged result. Furthermore, the production of optical glass with a larger content in fluorine generally involves very great difficulties because of the inclination of such a glass to form striae. The glass types according to the present invention are therefore free of fluorine. In their simplest form, they merely consist of boric acid, lanthanum oxide, and $ThO_2$. It has unexpectedly been found that in such a system there is a very narrow range of a limited length which is entirely stable. This range is indicated in FIGURE 2. It may be defined by the following coordinates:

| $La_2O_3$, Percent by Weight | $B_2O_3$, percent by Weight |
|---|---|
| 37 | 34–35 |
| 38 | 33–35 |
| 40 | 31.5–35 |
| 41–43 | 31–35 |
| 46 | 32–36 |
| 50 | 33.5–38 |
| 52 | 34.8–38.8 |
| 54 | 36.0–39.5 |
| 56 | 37.5–40.0 |
| 57 | 38.0–40.0 | the remainder consisting of $ThO_2$, and wherein intermediate values are to be linearly interpolated.

Although the stated critical values may vary slightly in individual measurements, the appearance of the range will not thereby be noticeably changed.

Although the examples S and T by Morey mentioned in the beginning are composed of the same components, they lie clearly outside of the stable range, as indicated in FIGURE 2. Because of its strikingly small width, this stability range has apparently so far not been noticed. It was found that the part A to B of the boundary limits of the area at the right side, that is, in the direction toward high boric acid contents, is dependent upon the fact that when these limits are exceeded toward the right, this will lead to a phase separation, that is, to a secretion of practically pure boric acid. If the boundary limits are exceeded at the other parts of the curve, a normal crystallization will occur. The stability of the glass considerably decreases even in the vicinity of the boundary limits. However, these limits are placed in FIGURE 2 so that in any case batches of at least 100 g. may be melted without crystallization. At the center of the area and in the vicinity of the right boundary, the stability is so great that pieces of a weight of many kilograms may be produced.

Figure 3:
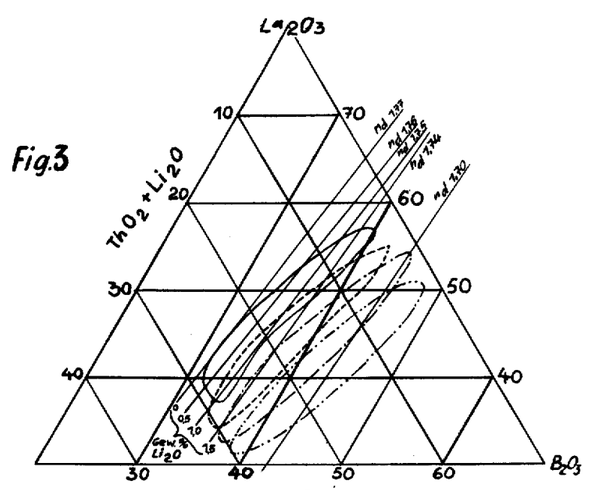

The refractive index of the glass types within the defined area lies between 1.735 and 1.77. If glass types of a lower refraction are desired, this may be attained by mixing the mentioned types with others of a lower refractive index. The latter must then likewise possess a $\nu$-value which is high relative to that of their refraction, and they should not contain any substances which together with the first glass type form difficultly soluble precipitates. For this reason, it is necessary that a noticeable content in fluorine and phosphoric acid be avoided since they will react with $Th^{+4}$, as well as a noticeable content in $SiO_2$ which has a precipitating effect upon high $La^{+3}$ contents. On the other hand, the borates of Li and of the alkaline earths are very suitable. A Li-borate glass suitable for the particular purpose must contain at least 9% of $Li_2O$ in order to avoid the occurrence of a phase boundary. In FIGURE 3, the areas corresponding to FIGURE 2 have been plotted on an enlarged scale for the systems 0.5% of $Li_2O+ThO_2+La_2O_3+B_2O_3$; 1.0% $Li_2O+ThO_2+La_2O_3+B_2O_3$ etc., aside from the original area of 0% of $LiO_2$. It may be seen that it will already be possible to avoid any phase separation by means of a content of only 1.5% in $Li_2O$ if the refractive index of the glass is not to be lowered to less than 1.70.

The areas in FIGURE 3 are limited by the following coordinates, the remainder consisting of $ThO_2$:

| $La_2O_3$, percent by weight | $B_2O_3$, percent by weight | $La_2O_3$, percent by weight | $B_2O_3$, percent by weight |
|---|---|---|---|
| 35 | 34.5–36.5 | 33 | 36.5–38.5 |
| 36 | 34 –37 | 34 | 36.0–39.0 |
| 38 | 33.5–38 | 36 | 35.8–40 |
| 40 | 33.5–38.5 | 38 | 36 –41 |
| 45 | 35 –40 | 40 | 36 –41.5 |
| 50 | 37 –42 | 45 | 36.5–44 |
| 52 | 38.5–42.5 | 50 | 40.5–45 |
| 54 | 41 –43 | 52 | 42 –45 |
| 55 | 42.5 | 54 | 44.5–45 |

Intermediate values in lithium may be attained by interpolation or, which is equivalent thereto, by a mixture of two glass types according to the invention with different lithium contents.

Naturally, the $Li_2O$ borate does not need to be added as a finished glass but the two glass types may be mixed as a conglomerate. A Na-borate glass corresponding to the Li-borate glass should only be added in very small amounts since the $\nu$-value of such Na-borate glass types is too low. On the other hand, the borate glass types of the alkaline earths, especially of BaO, SrO, and CaO are especially suitable. In the event that a glass of alkaline earths and boric acid can be melted without phase separation, for example, a mixture of 72.5% of $B_2O_3$, 7.4% of CaO, and 20.1% of BaO, even the mixture of this glass with the lanthanum-thorium borate glass will not result in a phase separation. Similarly, an alkaline earth borate glass which as such is sufficiently stable against crystallization, will also result in a glass which is stable against crystallization when mixed with an existing stable glass consisting of $B_2O_3+La_2O_3+ThO_2$. Very unexpectedly it has even been found that such mixtures are frequently more stable than the starting glass types from which the glass in question is to be built up. It has, for example, been found that in mixtures which contain at least 5% of a stable alkaline earth borate glass, the narrow tip BCD, as indicated in FIGURE 2, which can be plotted by a straight-line connection of the points with the coordinates ($La_2O_3=57\%$; $B_2O_3=38\%$; $ThO_2=5\%$), ($La_2O_3=57\%$; $B_2O_3=40\%$; $ThO_2=3\%$), and $$(La_2O_3=60\%; B_2O_3=40\%)$$

and which by itself would produce glass types of a very low stability, is still very well usable in the mixture (see Table III, Example 1). Since this tip of the curve extends up to 0% $ThO_2$, 60% $La_2O_3$, 40% $B_2O_3$, it will be possible in this manner to attain glass types which are free of thorium at an $n_d$-value of up to about 1.72.

Figure 4:
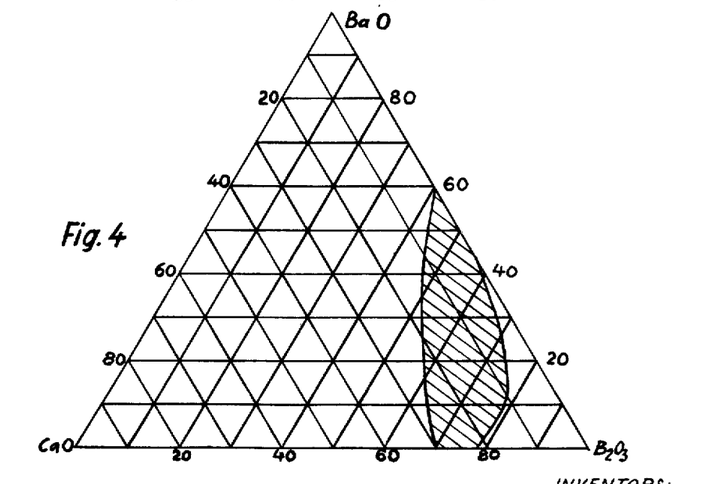
Figure 5:
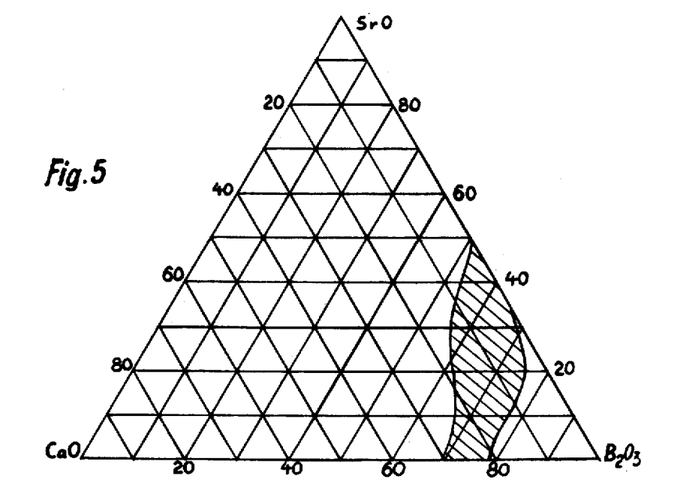

As a summary, the stable glass range in the systems $B_2O_3$—BaO—CaO and $B_2O_3$—SrO—CaO has been entered in FIGURES 4 and 5 in triangular coordinates. For the four-component system $B_2O_3$—BaO—SrO—CaO, the stable glass range may be interpolated with sufficient accuracy by a linear superposition of the mentioned three-component glass ranges.

The mixture of the alkaline earth borate glass with the lanthanum thorium borate glass is fundamentally possible in any desired ratio. However, in the interest of extreme $\nu$-values it is advisable to make the addition so small that the sum of lanthanum and thorium oxides remaining in the mixture will exceed 45%. The molar ratio of the sum of alkaline earths and $Li_2O$ into $B_2O_3$ should for the same reason preferably remain less than 0.2. In order to attain a glass of a predetermined refractive index by mixing, the dependency of the refractive index upon the mixing ratio was determined by experiment for a number of different glass combinations. This generally resulted in a curve which was only slightly bent. However, it is possible to distort the abscissa to such an extent that this curve will become a straight line. Then it will be found that mixtures of other components when plotted on this distorted abscissa will also lie in a straight line.

Figure 6:
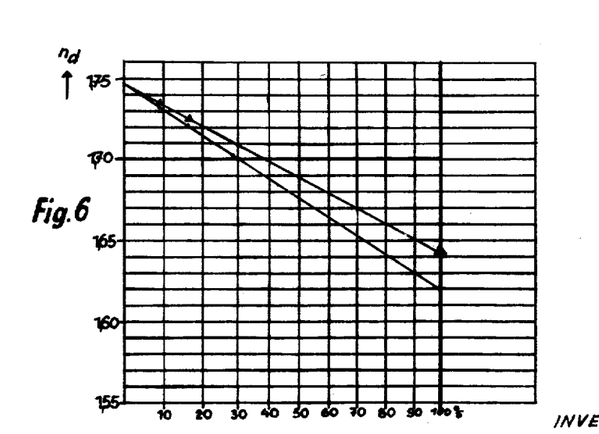

In diagram 6, the dependency of the refractive index $n_d$ on the content in alkaline earth borate glass has been entered. Thus, if the refractive indices of two glass types to be mixed are entered on the abscissae 0 and 100, and are then connected by a straight line, it is possible to read off immediately in which ratio the two components must be mixed in order to attain a mixed glass of a pre-determined refractive index. For mixing two different glass types with alkaline earth borate glass, the straight lines have been plotted in FIGURE 6.

In place of the alkaline earth borate glass, it is also possible to add Cd borate or zinc borate glass. Such glass types must, however, contain small additions of alkali, best of all $Li_2O$ or alkaline earth, in order to prevent a phase separation. Also, in this case, the mixture may be of any desired ratio, although the total molar ratio of the added bivalent oxides plus $Li_2O$ into $B_2O_3$ should remain less than 0.2 since otherwise the glass will lose its extreme character. For the same reason, $SiO_2$, $Al_2O_3$, and $Na_2O$ should only be present in the smallest possible amounts even in such glass types in which they do not endanger the stability.

Although when adding highly refractive quadrivalent, pentavalent, and hexavalent oxides, such as $ZrO_2$, $Nb_2O_5$, and $WO_3$, the $\nu$-value will likewise decrease, their application in small amounts may sometimes still be of advantage, for example, because of the increase in the chemical stability. It may then be calculated that a substitution of 1% of $La_2O_3$ by 1% of $Ta_2O_5$ or 1% of $WO_3$ or 1% of $ZrO_2$ will result in a reduction of the $\nu$-value by about 0.3. To apply larger amounts is only then of advantage if the refractive indices exceed 1.76 or even 1.77 because the glass which only consists of $B_2O_3$, $La_2O_3$, and $ThO_2$ will then start to crystallize. However, an addition of $ZrO_2$ and especially of $Ta_2O_5$ or niobium to one of the stable glass types of the range according to FIGURE 2 will permit still higher refractive indices to be reached without passing into an area which is endangered by crystallization. The addition of $Ta_2O_5$, $ZrO_2$, etc. should, however, also in this case remain below 12% since otherwise the optical position will become too much impaired. Even with 6% of $Ta_2O_5$ it will be possible to reach refractive indices of more than 1.80. With $Ta_2O_5$ the conditions will be especially favorably affected since it is capable of replacing a part of the boric acid; that is, 1% of $Ta_2O_5$ will replace about 0.4 parts of $B_2O_3$.

For this reason, the one triangular coordinate entered in FIGURE 2 does not consist merely of boric acid but of $B_2O_3+0.4Ta_2O_5$. The glass types containing tantalum should therefore lie within an area which is determined by FIGURE 2 which has been thus generalized.

Didymium oxide may also be added in smaller amounts to the glass types according to the invention. This will result in a slightly pinkish tint which, possibly in combination with a yellow-tinted glass, will result in a favorable neutral color of the entire glass.

The production of the glass types according to the invention proceeds in the manner conventional for the production of borate glass. An approved method is the following:

At a moderate temperature, one of 1250° C. being usually sufficient, the well-homogenized mixture is inserted into a platinum crucible in an electric furnace and, after being completely melted, the temperature is increased by about 100° C. in order to expel the bubbles. As a refining agent $As_2O_3$ in amounts up to 0.5% is for this purpose especially recommended. Only if there are greater amounts of $ZrO_2$ and $Ta_2O_5$, it may sometimes be necessary to increase the melting temperature up to 1400° C. so that everything will go into solution. It is then advisable to grind these materials as fine as possible so that they will not merely sink to the bottom. After refining, which requires for a 400 g. batch approximately ½ hour, the mass is well homogenized by stirring it for about ¼ hour at about 1250° C. with a platinum stirrer and, while being uniformly stirred, it is then cooled down to about 1050 or 1000° C. within about ¼ hour. It is then cast in the usual manner into a steel mold, which has been rubbed with magnesium oxide and preferably preheated to about 300° C., and is then slowly cooled in an annealing furnace. If the purest possible raw materials are used, the glass types according to the invention will be practically colorless, even at refractive indices above 1.77. They are hard and well polishable, and fully comply with the requirements which may be made of them, for example, for photographic lenses.

The raw materials to be applied preferably consist as usual of the oxides of lanthanum, tantalum, zirconium, tungsten, zinc, cadmium, the nitrates of thorium, barium, and strontium, the carbonate or nitrate of lithium and calcium, and the hydrated oxide of boric acid. It is not necessary to pre-dehydrate the boric acid. The indications in the figures and tables relate to the synthesis in which the mentioned raw materials are used. In the analysis, the ratio of all of the oxides, except $B_2O_3$, will be found unchanged in the finished glass as compared with the synthesis. Only a small amount of the $B_2O_3$, approximately 2% of the amount applied, will evaporate if the raw material is applied as intended in the form of the hydrate of $B_2O_3$. In the analysis, the contents in the individual materials will therefore shift relative to the synthesis in accordance with the formula $$piA = piS \cdot \frac{100}{100 - 2\frac{pBS}{100}}$$

for all materials other than $B_2O_3$ and $$pBA = \frac{pBS \cdot (100-2)}{100 - \frac{2}{100}pBS}$$

for boric acid.

In these formulas, $pi$ means the percentage of the material designated with "$i$," while $pB$ means the percentage of boric acid. The second index A or S, respectively, indicates whether the value pertains to the analysis or synthesis.

The accompanying Tables I to V show a series of characteristic examples of the glass types according to the invention.

Table I contains glass types which consist merely of $B_2O_3$, $La_2O_3$, and $ThO_2$. The meaning of the columns $\nu_0$ (calculated) and $\Delta\nu$ is described at the beginning. It may be seen from Table I that the formula is very suitable for calculating the $\nu_0$ since $\Delta\nu$ of the majority of the glass types has an almost constant value of approximately 1 within the entire refractive range. Thus, in estimating the technical advantage attained by the invention over the state of the prior art, the variation of the $n_d$ value of the test batches which is unavoidable because of the fact that the melting conditions are not entirely constant, may be disregarded.

Table II contains glass types which additionally contain $Li_2O$. The $\Delta\nu$ value is on the average slightly smaller than that in Table I, but still entirely positive. The same applies to the $\Delta\nu$ values of Table III for mixtures with alkaline-earth glass types.

The column "Mixture" indicates the components from which the resulting glass has been mixed.

Table IIIa gives a general view of the composition of these components. Column $p$ of Table III indicates which percentage by weight of the glass mixture consists of the respective alkaline-earth glass.

Table IV contains glass types with a content in $Ta_2O_5$. The upper line of each number shows the composition of the basic glass consisting of $B_2O_3$, $La_2O_3$, and $ThO_2$, while the values of the fifth column indicate the added constituent in $Ta_2O_5$. Each lower line shows the composition, converted to percents of the total weight. It may be seen that the basic glass types 1 to 5 lie definitely outside of the stable area of FIGURE 2. The $Ta_2O_5$ therefore possesses the quality previously mentioned that it can partly replace the boric acid.

Table V contains examples with further ingredients. The refractive and $\Delta \nu$ values pertaining thereto will be found in Table Va.

Among the glass types according to the invention there are some with a composition which lies within certain narrow limits within which they are very stable against crystallization.

The compositions are in percentages by weight, in the order of the increasing boric acid content as follows:

35–36% $B_2O_3$; 43–50% $La_2O_3$; 14–21% $ThO_2$; 0–0.5% $Li_2O$; 0–2.5% $Ta_2O_5$;

39–40% $B_2O_3$; 54–56% $La_2O_3$; 4–6% $ThO_2$;
39.5–41% $B_2O_3$; 44–47% $La_2O_3$; 0.5–1% $Li_2O$; 11.5–15% $ThO_2$;
42–44% $B_2O_3$; 49.5–51% $La_2O_3$; 0–5% $ThO_2$; 1.8–4.5% BaO; 0.5–2% CaO;
42–44% $B_2O_3$; 53–55% $La_2O_3$; 1.5–2% BaO; approximately 1.0% ZnO; approximately 31% $B_2O_3$; 41.5% $La_2O_3$; 27.5% $ThO_2$ with an addition of 4–10% $Ta_2O_5$.

Table I
[Percentages by weight]

| No. | $B_2O_3$ | $La_2O_3$ | $ThO_2$ | $n_d$ | $\nu$ | $\nu_0$ calculated | $\Delta\nu$ |
|---|---|---|---|---|---|---|---|
| 1 | 31.0 | 41.5 | 27.7 | 1.7668 | 52.25 | 51.39 | 0.86 |
| 2 | 31.7 | 43.5 | 24.4 | 1.7732 | 52.08 | 50.98 | 1.10 |
| 3 | 32.99 | 39.74 | 27.27 | 1.7658 | 52.05 | 51.45 | 0.60 |
| 4 | 34.5 | 40.0 | 25.5 | 1.7501 | 53.49 | 52.45 | 1.04 |
| 5 | 34.6 | 51.4 | 14.0 | 1.7596 | 52.88 | 51.85 | 1.03 |
| 6 | 35.0 | 44.0 | 21.0 | 1.7498 | 53.51 | 52.47 | 1.04 |
| 7 | 35.5 | 46.3 | 18.2 | 1.7464 | 53.66 | 52.69 | 0.97 |
| 8 | 36.0 | 50.0 | 14.0 | 1.7551 | 53.01 | 52.13 | 0.88 |
| 9 | 38.0 | 50.0 | 12.0 | 1.7375 | 54.00 | 53.52 | 0.48 |
| 10 | 39.0 | 54.0 | 7.0 | 1.7318 | 54.61 | 53.62 | 0.99 |
| 11 | 39.0 | 56.0 | 5.0 | | | | |
| 12 | 40.0 | 56.0 | 4.0 | 1.7393 | 54.14 | 53.14 | 1.00 |
| T | 26.0 | 33.0 | 41.0 | 1.7667 | 51.4 | 51.4 | 0 |
| S | 40.0 | 60.0 | | 1.7227 | 54.1 | 54.19 | −0.09 |

Table II
[Percentages by weight]

| No. | $B_2O_3$ | $La_2O_3$ | $ThO_2$ | $Li_2O$ | $n_d$ | $\nu$ | $\nu_0$ (cal.) | $\Delta\nu$ |
|---|---|---|---|---|---|---|---|---|
| 1 | 34.4 | 50.4 | 15.0 | 0.2 | 1.7619 | 53.04 | 51.70 | 1.34 |
| 2 | 38.0 | 40.7 | 20.8 | 0.5 | 1.7357 | 54.02 | 53.37 | 0.65 |
| 3 | 38.8 | 49.7 | 11.0 | 0.5 | 1.7330 | 54.17 | 53.53 | 0.64 |
| 4 | 39.8 | 44.3 | 14.9 | 1.0 | 1.7285 | 54.94 | 53.82 | 1.02 |
| 5 | 40.0 | 36.0 | 23.0 | 1.0 | 1.7196 | 54.81 | 54.39 | 0.42 |
| 6 | 40.0 | 46.5 | 13.0 | 0.5 | 1.7243 | 54.34 | 54.09 | 0.25 |
| 7 | 40.0 | 47.5 | 12.0 | 0.5 | 1.7257 | 54.64 | 54.00 | 0.64 |
| 8 | 40.0 | 46.0 | 13.25 | 0.75 | 1.7298 | 53.96 | 53.74 | 0.22 |
| 9 | 40.0 | 54.0 | 5.5 | 0.5 | 1.7269 | 54.79 | 53.93 | 0.86 |
| 10 | 40.8 | 46.8 | 11.8 | 0.6 | 1.7130 | 55.57 | 54.81 | 0.76 |
| 11 | 41.6 | 40.6 | 16.8 | 1.0 | 1.7167 | 55.17 | 54.58 | 0.59 |
| 12 | 42.0 | 50.0 | 7.5 | 0.5 | 1.7132 | | | |
| 13 | 42.0 | 50.0 | 7.0 | 1.0 | 1.7211 | 54.52 | 54.28 | 0.24 |
| 14 | 42.0 | 54.0 | 3.5 | 0.5 | 1.7214 | 54.86 | 54.28 | 0.58 |
| 15 | 43.0 | 56.0 | 0.25 | 0.75 | 1.7168 | 55.32 | 54.57 | 0.75 |
| 16 | 45.0 | 50.0 | 4.0 | 1.0 | 1.7033 | 56.10 | 55.42 | 0.68 |
| 17 | 45.0 | 54.0 | | 1.0 | 1.7056 | 56.03 | 55.28 | 0.75 |

Table III
[Percentages by weight]

| No. | $B_2O_3$ | $La_2O_3$ | $ThO_2$ | BaO | CaO | SrO | Mixture | $p$ | $n_d$ | $\nu$ | $\nu$ |
|---|---|---|---|---|---|---|---|---|---|---|---|
| 1 | 42.2 | 55.33 | | 1.80 | 0.67 | | S+D | 7.4 | 1.7188 | 55.25 | 0.81 |
| 2 | 43.6 | 51.81 | | 3.35 | 1.24 | | S+D | 13.8 | 1.7037 | | |
| 3 | 44.6 | 49.61 | | 4.24 | 1.55 | | S+D | 17.4 | 1.7027 | 55.76 | 0.29 |
| 4 | 43.2 | 45.65 | | 8.60 | 3.25 | | S+A | 25.0 | 1.7012 | 55.89 | 0.33 |
| 5 | 37.6 | 43.12 | 15.0 | 3.10 | 1.18 | | V+A | 9.1 | 1.7324 | 54.44 | 0.86 |
| 6 | 38.8 | 39.62 | 13.75 | 5.66 | 2.17 | | V+A | 16.6 | 1.7212 | 54.79 | 0.50 |
| 7 | 40.8 | 34.00 | 11.8 | 9.70 | 3.70 | | V+A | 28.5 | 1.7047 | 55.05 | 0.31 |
| 8 | 36.5 | 43.10 | 15.0 | 5.40 | | | V+B | 9.1 | 1.7348 | 54.26 | 0.84 |
| 9 | 36.7 | 39.65 | 13.75 | 9.90 | | | V+B | 16.6 | 1.7244 | 54.15 | 0.07 |
| 10 | 38.4 | 39.70 | 13.8 | 4.80 | | 3.3 | V+C | 16.6 | 1.7205 | 54.69 | 0.35 |
| 11 | 37.3 | 40.83 | 19.5 | 1.80 | 0.67 | | U+D | 7.4 | 1.7345 | 54.00 | 0.55 |
| 12 | 40.2 | 46.33 | 11.1 | 1.80 | 0.67 | | W+D | 7.4 | 1.7229 | 54.46 | 0.28 |
| 13 | 44.02 | 39.50 | 9.45 | 5.20 | 1.83 | | W+D | 21.3 | 1.6935 | 56.00 | −0.05 |
| 14 | 42.0 | 50.93 | 4.6 | 1.80 | 0.67 ZnO | | X+D | 7.4 | 1.7150 | 55.15 | 0.47 |
| 15 | 42.0 | 55.03 | | 1.80 | 0.97 | | Compare No. 1 | | 1.7098 | 55.48 | 0.48 |

Table IIIa

| No. | $B_2O_3$ | $La_2O_3$ | $ThO_2$ | BaO | CaO | SrO | $n_d$ | $\nu$ |
|---|---|---|---|---|---|---|---|---|
| A | 53.0 | | | 34.0 | 13 | | 1.6200 | |
| B | 40.5 | | | 59.5 | | | 1.6430 | |
| C | 50.2 | | | 29.8 | | 20 | 1.6180 | |
| D | 66.5 | | | 24.4 | 8.95 | | 1.5900 | |
| S | 40.0 | 60.0 | | | | | | |
| U | 35.0 | 44.0 | 21.0 | | | | 1.7498 | 53.51 |
| V | 36.0 | 47.5 | 16.5 | | | | 1.7460 | 53.66 |
| W | 38.0 | 50.0 | 12.0 | | | | 1.7375 | 54.00 |
| X | 40.0 | 55.5 | 5.0 | | | | 1.7370 | 54.20 |

Table IV

| No. | $B_2O_3$ | $La_2O_3$ | $ThO_2$ | $Ta_2O_5$ | $n_d$ | $\nu$ |
|---|---|---|---|---|---|---|
| 1 | 29.0 / 27.65 | 43.4 / 41.4 | 27.4 / 26.05 | 5.05 / 4.8 | 1.7922 | 49.95 |
| 2 | 30.0 / 28.6 | 42.4 / 40.3 | 27.7 / 26.3 | 5.05 / 4.8 | 1.7896 | 49.79 |
| 3 | 30.0 / 28.6 | 43.75 / 41.6 | 26.2 / 25.0 | 5.05 / 4.8 | 1.7813 | 50.53 |
| 4 | 30.0 / 28.6 | 44.75 / 42.6 | 25.2 / 24.0 | 5.05 / 4.8 | 1.7882 | 50.03 |
| 5 | 30.0 / 28.6 | 45.75 / 43.6 | 24.2 / 23.0 | 5.05 / 4.8 | 1.7992 | 49.38 |
| 6 | 31.03 / 29.7 | 41.38 / 39.40 | 27.59 / 26.3 | 5.0 / 4.6 | 1.7837 | 50.3 |
| 7 | 31.03 / 29.2 | 41.38 / 38.8 | 27.59 / 25.9 | 6.5 / 6.1 | 1.7912 | 49.66 |
| 8 | 31.03 / 28.2 | 41.38 / 37.7 | 27.59 / 25.1 | 10.0 / 9.1 | 1.7970 | 49.30 |
| 9 | 31.0 / 27.7 | 41.3 / 36.9 | 27.7 / 24.7 | 12.0 / 10.7 | 1.8022 | 47.65 |

Table V
[Percentages by weight]

| No. | $B_2O_3$ | $La_2O_3$ | $ThO_2$ | BaO | ZnO | CdO | $Ta_2O_5$ | $ZrO_2$ | $WO_3$ | $Li_2O$ | SrO |
|---|---|---|---|---|---|---|---|---|---|---|---|
| 1 | 36.3 | 42.9 | 13.0 | 3.1 | 2.1 | | 2.3 | | | 0.3 | |
| 2 | 36.3 | 40.9 | 15.0 | | 5.2 | | 2.3 | | | 0.3 | |
| 3 | 36.4 | 52.1 | 6.8 | | 2.1 | | 2.3 | | | 0.3 | |
| 4 | 34.7 | 46.6 | 14.0 | | 2.1 | | 2.3 | | | 0.3 | |
| 5 | 34.7 | 48.8 | 13.9 | | | | 2.3 | | | 0.3 | |
| 6 | 30.7 | 40.4 | 15.5 | 0.9 | 4.4 | 1.8 | 2.6 | 2.6 | 0.6 | 0.2 | 0.3 |
| 7 | 34.2 | 49.4 | 3.4 | | 1.6 | 5.8 | 3.1 | 2.2 | | 0.3 | |
| 8 | 41.5 | 41.8 | 11.0 | 1.0 | 2.1 | | 2.3 | | | 0.3 | |

Table Va

| No. | $n_d$ | $\nu$ | $\nu_0$ calculated | $\nu$ |
|---|---|---|---|---|
| 1 | 1.7381 | 53.11 | 53.22 | −0.11 |
| 2 | 1.7351 | 53.00 | 53.40 | −0.40 |
| 3 | 1.7434 | 52.72 | 52.88 | −0.16 |
| 4 | 1.7501 | 51.51 | 52.45 | +0.05 |
| 5 | 1.7587 | 52.39 | 51.90 | +0.49 |
| 6 | 1.7734 | 49.55 | 50.97 | −1.42 |
| 7 | 1.7570 | 50.4 | 52.00 | −1.60 |
| 8 | 1.7199 | 53.20 | 54.36 | −1.16 |

Although our invention has been illustrated and described with reference to the preferred embodiments thereof, we wish to have it understood that it is in no way limited to the details of such embodiments, but is capable of numerous modifications within the scope of the appended claims.

Having thus fully described our invention, what we claim is:

1. An optical glass having a refractive index between 1.70 and 1.82 and a high $\nu$-value of at least 45 and consisting essentially of $La_2O_3$, $ThO_2$ and $B_2O_3$, the $La_2O_3$ and $B_2O_3$ being present in the glass composition within an area determined by the following coordinates expressed in percentages by weight:

| $La_2O_3$ | $B_2O_3$ |
|---|---|
| 37 | 34–35 |
| 38 | 33–35 |
| 40 | 31.5–35 |
| 41–43 | 31–35 |
| 46 | 32–36 |
| 50 | 33.5–38 |
| 52 | 34.8–38.8 |
| 54 | 36–39.5 |
| 56 | 37.5–40 |
| 57 | 38–40 | the remainder consisting of $ThO_2$.

2. An optical glass as defined in claim 1, additionally containing from 0.1 to 0.5% of $Li_2O$ and wherein the composition of the remaining components lies within an area determined by the following coordinates, given in percentages by weight:

| $La_2O_3$ | $B_2O_3$ |
|---|---|
| 35 | 34.5–36.5 |
| 36 | 34–37 |
| 38 | 33.5–38 |
| 40 | 33.5–38.5 |
| 45 | 35–40 |
| 50 | 37–42 |
| 52 | 38.5–42.5 |
| 54 | 41–43 |
| 55 | 42.5 | the remainder consisting of $ThO_2$.

3. An optical glass as defined in claim 1, additionally containing from 0.6 to 1% of $Li_2O$ and the composition of the remaining components lies within an area determined by the following components, given in percentages by weight:

| $La_2O_3$ | $B_2O_3$ |
|---|---|
| 33 | 36.5–38.5 |
| 34 | 36.0–39.0 |
| 36 | 35.8–40 |
| 38 | 36–41 |
| 40 | 36–41.5 |
| 45 | 36.5–44 |
| 50 | 50.5–45 |
| 52 | 42–45 |
| 54 | 44.5–45 | the remainder consisting of $ThO_2$.

4. An optical glass as defined in claim 1 additionally containing from 1.1 to 1.5% of $Li_2O$ and the composition of the remaining components lies within an area determined by the following coordinates given in percentages by weight:

| $La_2O_3$ | $B_2O_3$ |
|---|---|
| 31 | 39–39.5 |
| 32 | 38–41 |
| 34 | 38–42.5 |
| 36 | 38.5–44 |
| 38 | 39–45 |
| 40 | 39.5–45.5 |
| 45 | 41–47.5 |
| 48 | 43.5–48 |
| 50 | 45–48 |
| 51 | 46.5–47.5 | the remainder consisting of $ThO_2$.

5. An optical glass as defined in claim 2, mixed with a stable Li-borate glass, and in which the content of said Li-borate glass in $Li_2O$ amounts to from 9 to 20% and the content of the finished glass in $Li_2O$ amounts to from 0.1 to 2%, the molar ratio of the total alkaline earths and $Li_2O$ to $B_2O_3$ in the mixture being less than 0.2.

6. An optical glass as defined in claim 3, mixed with a stable Li-borate glass, and in which the content of said Li-borate glass in $Li_2O$ amounts to from 9 to 20% and the content of the finished glass in $Li_2O$ amounts to from 0.1 to 2%, the molar ratio of the total alkaline earths and $Li_2O$ to $B_2O_3$ in the mixture being less than 0.2.

7. An optical glass as defined in claim 4, mixed with a stable Li-borate glass, and in which the content of said Li-borate glass in $Li_2O$ amounts to from 9 to 20% and the content of the finished glass in $Li_2O$ amounts to from 0.1 to 2%, the molar ratio of the total alkaline earths and $Li_2O$ to $B_2O_3$ in the mixture being less than 0.2.

8. An optical glass having a refractive index between 1.70 and 1.82 and a high $\nu$-value of at least 45 and having a composition consisting of a mixture of a glass as defined in claim 1 with a stable alkaline-earth borate glass, in which the alkaline earth borate glass consists essentially of 40.5 to 78.5% of $B_2O_3$, with the remainder being at least one of BaO, CaO and SrO, and wherein the molar ratio of the total alkaline earths present to boric acid amounts in the finished glass to less than 0.2.

9. An optical glass having a refractive index between 1.70 and 1.82 and a high $\mu$-value of at least 45 and having a composition consisting of a mixture of a glass within a composition range determined by a straight-line connection of the coordinates ($La_2O_3=57$; $B_2O_3=38$; $ThO_2=5$) ($La_2O_3=57$; $B_2O_3=40$; $ThO_2=3$) and $$(La_2O_3=60; B_2O_3=40)$$

together with at least 5% of a stable alkaline-earth borate glass, in which the alkaline earth borate glass consists essentially of 40.5 to 78.5% of $B_2O_3$, with the remainder being at least one of BaO, CaO and SrO wherein the molar ratio of the total alkaline earths present to $B_2O_3$ in the mixture is less than 0.2.

10. An optical glass having a refractive index between 1.70 and 1.82 and a high $\nu$-value of at least 45 and having a composition consisting of a mixture of a glass as defined in claim 1 with a stable Zn-Cd-Li-borate glass within the system of zinc oxide, cadmium oxide, lithium oxide, and boric acid, and wherein the molar ratio of $ZnO+CdO+Li_2O$ to boric acid does not exceed a value of 0.2 in the finished glass.

11. An optical glass consisting of a glass mixture as defined in claim 2, wherein the molar ratio of the total bivalent oxides $+Li_2O$ to boric acid is less than 0.2 in the finished glass.

12. An optical glass as defined in claim 1, in which the content of the finished glass in $La_2O_3$ amounts to about 45–47% by weight.

13. An optical glass as defined in claim 1, further consisting of at least one additional oxide selected from the group consisting of $ZrO_2$, $SnO_2$, $Ta_2O_5$, $Nb_2O_5$, and $WO_3$ in an amount not exceeding a total of 12%.

14. An optical glass as defined in claim 1, wherein 0.4% of the $B_2O_3$ is replaced by 1% of $Ta_2O_5$.

15. An optical glass as defined in claim 1, consisting essentially of the following composition in percentages by weight: 35 to 36% of $B_2O_3$; 43 to 50% of $La_2O_3$; 14 to 21% of $ThO_2$; 0 to 0.5% of $Li_2O$; and 0 to 2.5% of $Ta_2O_5$.

16. An optical glass as defined in claim 1, consisting essentially of the following composition in percentages by weight: 39 to 40% of $B_2O_3$; 54 to 56% of $La_2O_3$; and 4 to 6% of $ThO_2$.

17. An optical glass as defined in claim 1, consisting essentially of the following composition in percentages by weight: 39.5 to 41% of $B_2O_3$; 44 to 47% of $La_2O_3$; 0.5 to 1% of $Li_2O$; and 11.5 to 15% of $ThO_2$.

18. An optical glass as defined in claim 1, consisting essentially of the following composition in percentages by weight: 42 to 44% of $B_2O_3$; 49.5 to 51% of $La_2O_3$; 0 to 5% of $ThO_2$; 1.8 to 4.5% of $BaO$; and 0.5 to 2% of $CaO$.

19. An optical glass as defined in claim 1, consisting essentially of the following composition in percentages by weight: 42 to 44% of $B_2O_3$; 53 to 55% of $La_2O_3$; 1.5 to 2.0% of $BaO$; and approximately 1.0% of $ZnO$.

20. An optical glass as defined in claim 1 consisting essentially of the following composition in percentages by weight: approximately 31% of $B_2O_3$; 41.5% of $La_2O_4$; and 27.5% of $ThO_2$, with an addition of 4 to 10% of $Ta_2O_5$ based on the total $B_2O_3$, $La_2O_3$, and $ThO_2$ present.

21. An optical glass consisting of a glass mixture as defined in claim 3, wherein the molar ratio of the total bivalent oxides+$Li_2O$ to boric acid is less than 0.2 in the finished glass.

22. An optical glass consisting of a glass mixture as defined in claim 4, wherein the molar ratio of the total bivalent ovides+$Li_2O$ to boric acid is less than 0.2 in the finished glass.

23. An optical glass as defined in claim 2, in which the content of the finished glass in $La_2O_3$ amounts to more than 45% by weight.

24. An optical glass as defined in claim 3, in which the content of the finished glass in $La_2O_3$ amounts to more than 45% by weight.

25. An optical glass as defined in claim 4, in which the content of the finished glass in $La_2O_3$ amounts to more than 45% by weight.

26. An optical glass as defined in claim 2, consisting of at least one additional oxide selected from the group consisting of $ZrO_2$, $SnO_2$, $Ta_2O_5$, $Nb_2O_5$, and $WO_3$ in an amount not exceeding a total of 12%.

27. An optical glass as defined in claim 3, further consisting of at least one additional oxide selected from the group consisting of $ZrO_2$, $SnO_2$, $Ta_2O_5$, $Nb_2O_5$, and $WO_3$ in an amount not exceeding a total of 12%.

28. An optical glass as defined in claim 4, consisting of at least one additional oxide selected from the group consisting of $ZrO_2$, $SnO_2$, $Ta_2O_5$, $Nb_2O_5$, and $WO_3$ in an amount not exceeding a total of 12%.

29. An optical glass as defined in claim 2, wherein 0.4% of the $B_2O_3$ is replaced by 1% of $Ta_2O_5$.

30. An optical glass as defined in claim 3, wherein 0.4% of the $B_2O_3$ is replaced by 1% of $Ta_2O_5$.

31. An optical glass as defined in claim 4, wherein 0.4% of the $B_2O_3$ is replaced by 1% of $Ta_2O_5$.

32. An optical glass as defined in claim 2, consisting essentially of the following composition in percentages by weight: 35 to 36% of $B_2O_3$; 43 to 50% of $La_2O_3$; 14 to 21% of $ThO_2$; 0.1 to 0.5% of $Li_2O$; and 0 to 2.5% of $Ta_2O_5$.

33. An optical glass as defined in claim 3, consisting essentially of the following composition in percentages by weight: 35 to 36% of $B_2O_3$; 43 to 50% of $La_2O_3$; 14 to 21% of $ThO_2$; 0.6 to 1.0% of $Li_2O$; and 0 to 2.5% of $Ta_2O_5$.

34. An optical glass as defined in claim 4, consisting essentially of the following composition in percentages by weight: 35 to 36% of $B_2O_3$; 43 to 50% of $La_2O_3$; 14 to 21% of $ThO_2$; 1.1 to 1.5% of $Li_2O$; and 0 to 2.5% of $Ta_2O_5$.

35. An optical glass as defined in claim 2, consisting essentially of the following composition in percentages by weight: 39 to 40% of $B_2O_3$; 54 to 56% of $La_2O_3$; 0.1 to 0.5% of $Li_2O$; and 4 to 6% of $ThO_2$.

36. An optical glass as defined in claim 3, consisting essentially of the following composition in percentages by weight: 39 to 40% of $B_2O_3$; 54 to 56% of $La_2O_3$; 0.6 to 1% of $Li_2O$; and 4 to 6% of $ThO_2$.

37. An optical glass as defined in claim 4, consisting essentially of the following composition in percentages by weight: 39 to 40% of $B_2O_3$; 54 to 56% of $La_2O_3$; 1.1 to 1.5% of $Li_2O$; and 4 to 6% of $ThO_2$.

38. An optical glass as defined in claim 2, consisting essentially of the following composition in percentages by weight: 39.5 to 41% of $B_2O_3$; 44 to 47% of $La_2O_3$; 0.1 to 0.5% of $Li_2O$; and 11.5 to 15% of $ThO_2$.

39. An optical glass as defined in claim 3, consisting essentially of the following composition in percentages by weight: 39.5 to 41% of $B_2O_3$; 44 to 47% of $La_2O_3$; 0.6 to 1% of $Li_2O$; and 11.5 to 15% of $ThO_2$.

40. An optical glass as defined in claim 4, consisting essentially of the following composition in percentages by weight: 39.5 to 41% of $B_2O_3$; 44 to 47% of $La_2O_3$; 1.1 to 1.5% of $Li_2O$; and 11.5 to 15% of $ThO_2$.

41. An optical glass as defined in claim 2, consisting essentially of the following composition in percentages by weight: 42 to 44% of $B_2O_3$; 49.5 to 51% of $La_2O_3$; 0.1 to 0.5% of $Li_2O$; 0 to 5% of $ThO_2$; 1.8 to 4.5% of $BaO$; and 0.5 to 2% of $CaO$.

42. An optical glass as defined in claim 3 consisting essentially of the following composition in percentages by weight: 42 to 44% of $B_2O_3$; 49.5 to 51% of $La_2O_3$; 0.6 to 1% of $Li_2O$; 0 to 5% of $ThO_2$; 1.8 to 4.5% of $BaO$; and 0.5 to 2% of $CaO$.

43. An optical glass as defined in claim 4 consisting essentially of the following composition in percentages by weight: 42 to 44% of $B_2O_3$; 49.5 to 51% of $La_2O_3$; 1.1 to 1.5% of $Li_2O$; 0 to 5% of $ThO_2$; 1.8 to 4.5% of $BaO$; and 0.5 to 2% of $CaO$.

44. An optical glass as defined in claim 2 consisting essentially of the following composition in percentages by weight: 42 to 44% of $B_2O_3$; 53 to 55% of $La_2O_3$; 0.1 to 0.5% of $Li_2O$; 1.5 to 2.0% of $BaO$; and approximately 1.0% of $ZnO$.

45. An optical glass as defined in claim 3 consisting essentially of the following composition in percentages by weight: 42 to 44% of $B_2O_3$; 53 to 55% of $La_2O_3$; 0.6 to 1% of $Li_2O$; 1.5 to 2.0% of $BaO$; and approximately 1.0% of $ZnO$.

46. An optical glass as defined in claim 4 consisting essentially of the following composition in percentages by weight: 42 to 44% of $B_2O_3$; 53 to 55% of $La_2O_3$; 1.1 to 1.5% of $Li_2O$; 1.5 to 2.0% of $BaO$; and approximately 1.0% of $ZnO$.

47. An optical glass as defined in claim 2 consisting essentially of the following composition in percentages by weight: approximately 31% of $B_2O_3$; 41.5% of $La_2O_3$; 0.1 to 0.5% of $Li_2O$; and 27.5% of $ThO_2$, with an addition of 4 to 10% of $Ta_2O_5$ based on the total $B_2O_3$, $La_2O_3$, and $ThO_2$ present.

48. An optical glass as defined in claim 3 consisting essentially of the following composition in percentages by weight: approximately 31% of $B_2O_3$; 41.5% of $La_2O_3$; 0.6 to 1% of $Li_2O$; and 27.5% of $ThO_2$, with an addition of 4 to 10% of $Ta_2O_5$ based on the total $B_2O_3$, $La_2O_3$, and $ThO_2$ present.

49. An optical glass as defined in claim 4 consisting essentially of the following composition in percentages by weight: approximately 31% of $B_2O_3$; 41.5% of $La_2O_3$; 1.1 to 1.5% of $Li_2O$; and 27.5% of $ThO_2$, with an addition of 4 to 10% of $Ta_2O_5$ based on the total $B_2O_3$, $La_2O_3$, and $ThO_2$ present.

50. An optical glass composition having an $n_d$ value of 1.7970 and a $\nu$ value of 49.30 consisting essentially of the following percentages by weight:

| | |
|---|---:|
| $B_2O_3$ | 31.03 |
| $La_2O_3$ | 41.38 |
| $ThO_2$ | 27.59 |
| $Ta_2O_5$ | 10.0 |

(based on the total of $B_2O_3$, $La_2O_3$ and $ThO_2$ present).

References Cited in the file of this patent

UNITED STATES PATENTS

| | | | |
|---|---|---|---|
| 2,206,081 | Eberlin | July 2, | 1940 |
| 2,434,149 | De Paolis | Jan. 6, | 1948 |
| 2,787,554 | De Paolis | Apr. 2, | 1957 |

FOREIGN PATENTS

| | | | |
|---|---|---|---|
| 608,298 | Great Britain | Sept. 13, | 1948 |
| 615,286 | Great Britain | Jan. 4, | 1949 |

UNITED STATES PATENT OFFICE
CERTIFICATE OF CORRECTION

Patent No. 3,082,101  March 19, 1963

Walter Geffcken et al.

It is hereby certified that error appears in the above numbered patent requiring correction and that the said Letters Patent should read as corrected below.

Column 5, line 55, after "generalized." insert -- The same applies to niobium. --; column 10, line 46, for "$\mu$-value" read -- $\nu$-value --; column 11, line 29, for "$La_2O_4$" read -- $La_2O_3$ --; line 31, for "$B_2C_3$" read -- $B_2O_3$ --; line 38, for "ovides" read -- oxides --; same column 11, lines 49 and 57, before "consisting", each occurrence, insert -- further --.

Signed and sealed this 8th day of October 1963.

(SEAL)
Attest:

ERNEST W. SWIDER
Attesting Officer

EDWIN L. REYNOLDS
Acting Commissioner of Patents